United States Patent
B

(10) Patent No.: US 10,445,193 B2
(45) Date of Patent: Oct. 15, 2019

(54) DATABASE FAILURE RECOVERY IN AN INFORMATION HANDLING SYSTEM

(71) Applicant: DELL PRODUCTS, LP, Round Rock, TX (US)

(72) Inventor: Govindaraja Nayaka B, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 187 days.

(21) Appl. No.: 15/450,805

(22) Filed: Mar. 6, 2017

(65) Prior Publication Data

US 2018/0253360 A1    Sep. 6, 2018

(51) Int. Cl.
G06F 11/00    (2006.01)
G06F 11/14    (2006.01)

(52) U.S. Cl.
CPC ...... G06F 11/1469 (2013.01); G06F 11/1464 (2013.01); *G06F 2201/80* (2013.01)

(58) Field of Classification Search
CPC .................. G06F 11/1464; G06F 11/1469
See application file for complete search history.

(56) References Cited

U.S. PATENT DOCUMENTS

| 7,343,453 | B2 * | 3/2008 | Prahlad | G06F 3/0605 711/117 |
| 8,397,022 | B2 | 3/2013 | Cherian | |
| 8,965,850 | B2 | 2/2015 | Varadarajan | |
| 9,495,252 | B2 | 11/2016 | Zhu et al. | |
| 2011/0282840 | A1 * | 11/2011 | Georgis | G06F 11/1464 707/647 |
| 2012/0005379 | A1 * | 1/2012 | Dutch | G06F 11/1448 710/31 |
| 2012/0150814 | A1 * | 6/2012 | Vijayan Retnamma | G06F 11/1453 707/674 |
| 2012/0226664 | A1 * | 9/2012 | Habermann | G06F 11/1464 707/641 |
| 2014/0201486 | A1 | 7/2014 | Zhu et al. | |
| 2014/0215265 | A1 * | 7/2014 | Mohanta | G06F 11/1458 714/15 |
| 2014/0310246 | A1 * | 10/2014 | Vijayan | G06F 11/1469 707/679 |
| 2017/0147441 | A1 * | 5/2017 | Binford | G06F 3/0619 |

* cited by examiner

*Primary Examiner* — Michael Maskulinski
(74) *Attorney, Agent, or Firm* — Larson Newman, LLP

(57) ABSTRACT

An information handling system includes a plurality of backup devices, and a host device. The backup devices stores backup copies of data in the information handling system. The host device includes a database to store the data for the information handling system, and restore circuitry. The restore circuitry receives a restore event notification indicating a failure of the database. The restore circuitry then determines a number of backup copies of the data in the backup devices, and selects a combination of the backup devices, including first and second backup devices, to restore the data to the database based on the number of backup copies. The restore circuitry also restores the data to the database via a first thread associated with the first backup device, and a second thread associated with the second backup device, and the first and second threads are executed in parallel.

18 Claims, 3 Drawing Sheets

DATABASE FAILURE RECOVERY IN AN INFORMATION HANDLING SYSTEM

FIELD OF THE DISCLOSURE

The present disclosure generally relates to information handling systems, and more particularly relates to database failure recovery in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems.

SUMMARY

Information handling systems can utilize remote data backup to provide redundancy for critical data of the information handling system. In existing recovery solutions, an information handling system can utilize multiple backup sources. However, the information handling system may only select a single backup source to restore data in response to a failure of a database storing the critical data in the information handling system.

Therefore an information handling system may include a plurality of backup devices and a host device. The backup devices may store backup copies of data in the information handling system. The host device includes a database to store the data for the information handling system, and restore circuitry. The restore circuitry may receive a restore event notification indicating a failure of the database. The restore circuitry may then determine a number of backup copies of the data in the backup devices, and may select a combination of the backup devices, including first and second backup devices, to restore the data to the database based on the number of backup copies. The restore circuitry also may restore the data to the database via a first thread associated with the first backup device, and a second thread associated with the second backup device, and the first and second threads are executed in parallel.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
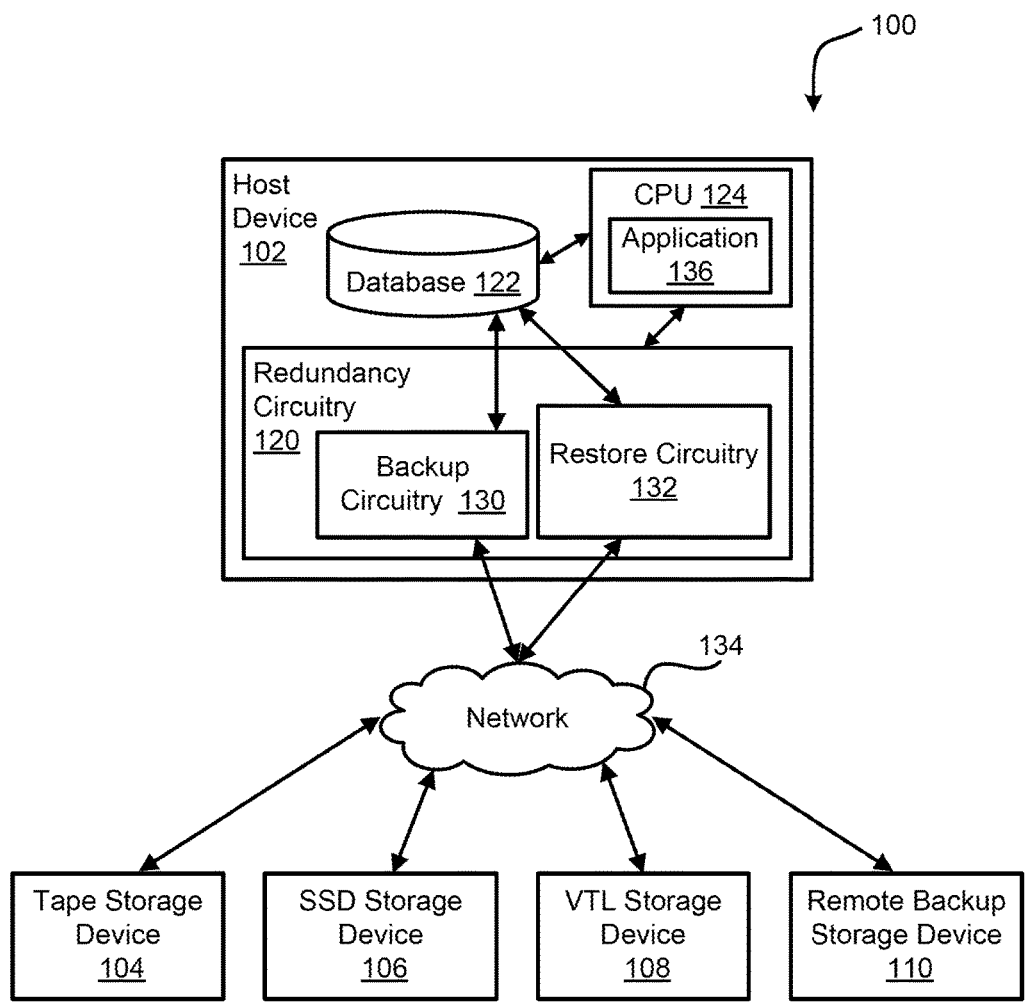
FIG. 1 is a block diagram of an information handling system with multiple backup storage devices according to an embodiment of the present disclosure.

FIG. 1 illustrates an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more buses operable to transmit communications between the various hardware components.

The information handling system 100 includes a host device 102 and a tape storage device 104, a solid state device (SSD) storage device 106, a virtual tape library (VTL) storage device 108, and a remote backup storage device 110 (backup devices 104, 106, 108, and 110). The host device 102 includes redundancy circuitry 120, a database 122, and a central processing unit (CPU) 124. The redundancy circuitry 120 includes backup circuitry 130 and restore circuitry 132. The CPU 124 is in communication with the redundancy circuitry 120. The backup circuitry 130 is in communication with the database 122, and with the tape storage device 104, the SSD storage device 106, the VTL storage device 108, and the remote backup storage device 110 via a network 134. The restore circuitry 130 is in communication with the database 122, and with the tape storage device 104, the SSD storage device 106, the VTL storage device 108, and the remote backup storage device 110 via the network 134. In an embodiment, the host device 102 can be server, a personal computer, or the like. In an embodiment, the redundancy circuitry 120, backup circuitry 130, and restore circuitry 132 can be application-specific integrated circuits (ASIC) designed to execute backup and restore operations for data stored in the database 122. For clarity and brevity, only a portion of the components of host device 102 are shown in FIG. 1, and discuss herein. However, one of ordinary skill in the art would recognize that the host device can include additional components, such as those described for information handling system 300 in FIG. 3 below, without varying from the scope of this disclosure.

During operation, the CPU 124 can execute code of an application 136, which in turn can cause the CPU 124 to perform different operations on data stored in the database 122. In an embodiment, the data in database 122 can be critical data required for operation of the host device 102, such that the data should be stored in one or more of the backup devices 104, 106, 108, and 110 to provide redundancy this the critical data. In an embodiment, the database can be divided into multiple logical units, and each of the logical units can be identified by a logical unit number (LUN) or volume identification (ID). When a determination is made that data stored in a particular logical unit of the database 122 should be stored in one or more of the backup devices 104, 106, 108, and 110, a backup event is triggered in the redundancy circuitry 120. In an embodiment, the backup event can identify a volume ID of the logical unit, and a priority level for the data of the particular the logical unit. The backup event can cause the backup circuitry 130 to store backup copies of the data in the identified logical unit into one or more of the backup devices 104, 106, 108, and 110.

After the backup copies have been stored in the one or more backup devices 104, 106, 108, and 110, the backup circuitry 130 can then create an entry in a backup record table, such as Table 1 below, for each backup copy.

TABLE 1

Backup Record Table

| Unique LUN/ Volume ID | Time of backup | Type of backup | Media type, Name and Device ID | Type of Data | Latency of the backup device | Throughput of the backup device |
|---|---|---|---|---|---|---|
| V101 | 11:01 AM Feb. 6, 2017 | Full | Tape, Device 104 | BIOS Config. | 20 ms | 15 MB/second |
| V101 | 11:01 AM Feb. 6, 2017 | Full | SSD, Device 106 | BIOS Config. | 0.09 ms | 550 MB/second |
| V101 | 11:01 AM Feb. 6, 2017 | Full | VTL, Device 108 | BIOS Config. | 25 ms | 10 MB/second |
| V101 | 11:01 AM Feb. 6, 2017 | Full | Remote, Device 110 | BIOS Config. | 4 ms | 100 MB/second |

In an embodiment, the unique LUN/Volume ID column of the backup record table can be any unique name for a volume/LUN across a network, such as network 134, irrespective of Internet small computer system interface/fibre-channel (iSCSI/FC) storage device naming scheme. In an embodiment, the time of backup column indicates at what time the backup was taken. In an embodiment, the type of backup column can identify whether the backup copy is a full backup, an incremental backup, a differential backup, or the like. In an embodiment, the media type column can identify the storage medium, such as tape, hard disk, SSD, VTL, or any other storage array in remote site. In an embodiment, the device ID can be a unique device ID, such as device 104, device 106, device 106, device 110, or the like. In an embodiment, the device ID can be vendor specific.

In an embodiment, the latency of the device column can indicate an amount of time it takes to access any device before it can actually transfer the data to or from that device. In an embodiment, this latency is applicable to a hard disk drive (HDD), tape drive, or SSD drive. For example, the latency of a hard disk can vary from 4 ms to 15 ms, and the latency of a SSD can vary from 0.08 ms to 0.16 ms. In case of storage arrays, the latency indicates time taken for a single read/write to finish in milliseconds, such as 20 ms. In an embodiment, the throughput of a device or data transfer rate of the device can indicate how much data can be read from a device, and the throughput for the backup devices 104, 106, 108, and 110 can be in MB/second or GB/second depending on the device. For example, the SSD device 106 can have a transfer rate ranging from 200-550 MB/second, whereas hard disk devices can have a transfer rate ranging from 50-120 MB/second. In an embodiment, the throughput for the backup devices 104, 106, 108, and 110 can be in GB/second in very high end devices. In an embodiment, the back record table can also include a size of data column, which can indicate and amount of data is written to a particular backup device. For example, the size of data can be megabytes, gigabytes, terabytes, or the like.

The information in the backup record table can be utilized during a data recovery operation. For example, the restore circuitry 132 can access the backup record table when performing a data recovery after failure of the database 122. In response to a failure of the database 122, a recovery event is triggered, which in turn causes the restore circuitry 132 to perform a recovery operation. In an embodiment, failure of the database 122 can be a failure of the entire database 122, a failure of particular logical units of the database 122, or the like. In an embodiment, the recovery event can identify the logical unit or units of the database 122 that have failed, different priority levels for the failed logical units, or the like.

During the recovery operation, the restore circuitry 132 can determine whether any of the failed logical units are associated with a priority level. If so, the restore circuitry 132 can begin a restore process with a highest priority level logical unit and select one or more backup device to retrieve backup copies of the data of the highest priority level logical unit. The restore circuitry 132 can then determine a number of backup copies associated with the failed logical unit, by identifying entries in the backup record table that are associated with the volume ID of the failed logical unit.

The restore circuitry 132 can then determine characteristics about the different backup devices 104, 106, 108, and 110 from the backup record table. In an embodiment, the characteristics media type, latency, throughput, or the like. The restore circuitry 132 can then determine a length of time to restore the data from each backup device 104, 106, 108, and 110 listed in the backup record table based on the latency and throughput for the device. The restore circuitry 132 can order the backup devices 104, 106, 108, and 110 based on the length of time to restore for each device, and can then determine a best combination of the backup devices 104, 106, 108, and 110 for the restore operation.

In an embodiment, the restore circuitry 132 can calculate the total restore time for different combinations of the backup devices 104, 106, 108, and 110 to restore the data for a failed logical unit with a volume ID of V101, as shown in Table 1 above. The restore circuitry 132 can determine that all four back devices 104, 106, 108, and 110 have a backup copy of the data, and can calculate different total restore times based on a percentage of data received from each back device, as shown in Table 2 below:

TABLE 2

Total Restore Times

| Volume ID | Backup Source 1 | Backup Source 2 | Backup Source 3 | Backup Source 4 | Total Restore Time |
|---|---|---|---|---|---|
| V101 | SSD, Device 106 | Remote Backup, Device 110 | Tape, Device 104 | VTL, Device 108 | |
| | 50% | 25% | 20% | 5% | 4 hrs |
| | 45% | 45% | 10% | 0% | 4 hrs 30 min |
| | 75% | 25% | 0% | 0% | 3 hrs 30 min |
| | 35% | 25% | 30% | 10% | 3 hrs 55 min |

Thus, based on the calculated total restore times above, the restore circuitry 132 can select the third combination of just the backup devices 106 and 110 to restore the data. In this combination, 75% of the data is retrieved from the SSD backup device 106 and the remaining 25% is retrieved from the remote backup storage device 110. The restore circuitry 132 can start the restore process of transferring data from the backup devices 106 and 110 to the database 122. In an embodiment, the percentages of the data to be retrieved from each backup device can be identified based on memory addresses of the logical unit, which can be stored as metadata in the backup copy The restore circuitry 132 can create a number of threads for the data restore equal to the number of backup devices being used to restore the data. Continuing with the example above, the restore circuitry 132 can create 2 threads, one thread for SSD backup device 106 and one thread for remote backup storage device 110. The threads can read data from the backup devices 106 and 110 in parallel. When the data restore operation is complete, the restore circuitry 132 can provide a completion notification to the CPU 124, which in turn can provide a notification to a user of the information handling system 100.

If, while determining the number of backup copies, the restore circuitry 132 determines that one of the backup copies has a different time of backup, the restore circuitry 132 can then use that backup device 104, 106, 108, or 110 to restore the incremental update to the data in that backup device during the restore operation. Thus, the combination of backup devices 104, 106, 108, and 110 to utilize during the restore operation, and retrieving the data via parallel threads can decrease an amount of time to restore the data as compared to utilizing on a single backup device.

Figure 2:
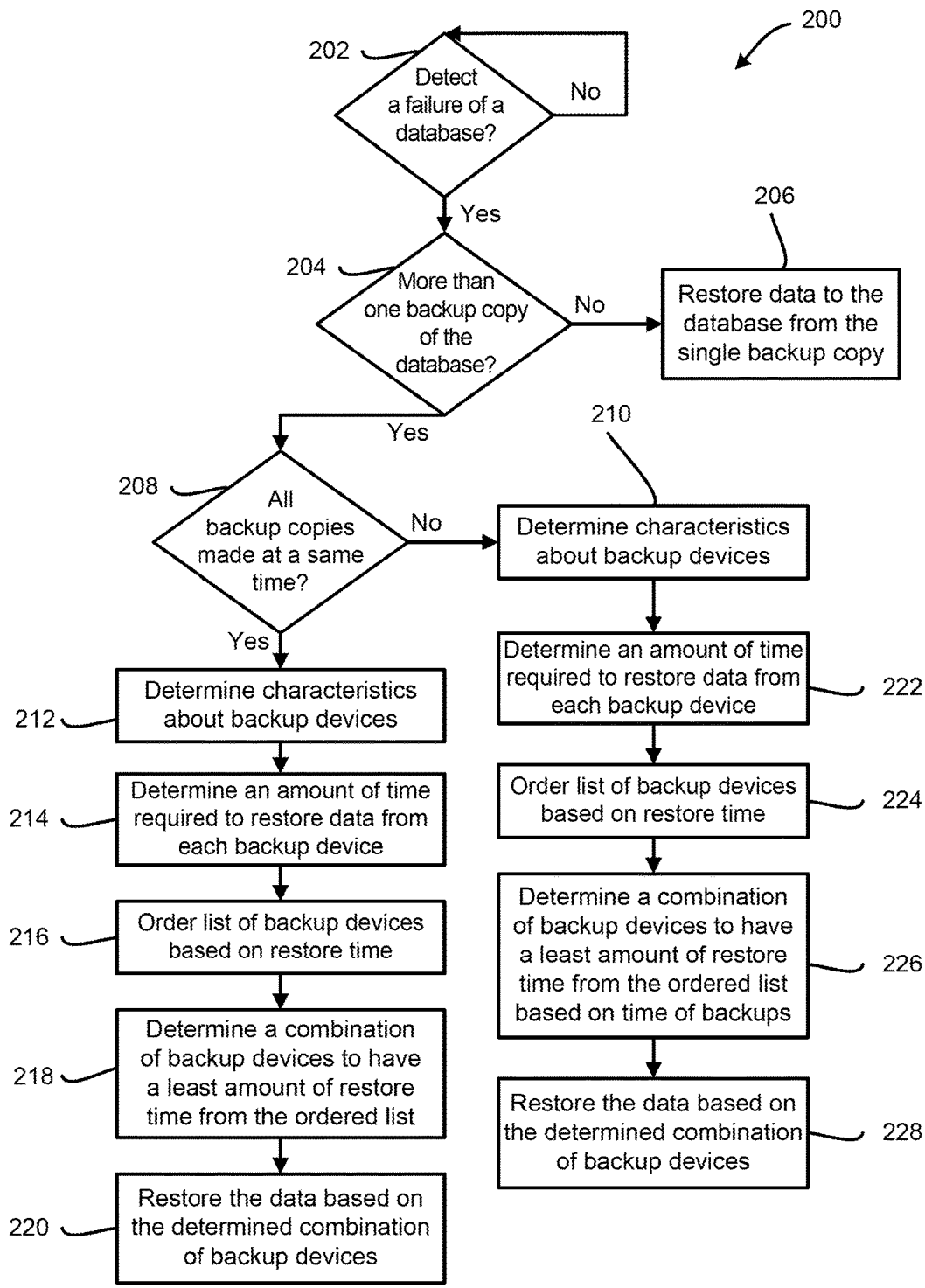
FIG. 2 is a flow diagram of a method for data recovery after a database failure according to an embodiment of the present disclosure.

FIG. 2 shows a method for data recovery after a database failure according to an embodiment of the present disclosure. At block 202, a determination is made whether a failure of a database has been detected. In an embodiment, the database failure can be a failure of an entire database, a failure of only one logical volume within a database, a failure of multiple logical volumes within the database, or the like. In response to the database failure being detected, a determination is made whether more than one backup copy of the database has been created at block 204. In an embodiment, the determination of the number of backup copies can be based on analyzing a backup record table, which can include a unique volume identification (ID) entry, a time of backup entry, a type of backup entry, a media type entry, a type of data, entry, a latency value for the backup device entry, a throughput value for the backup device entry, or the like.

If there is not more than one backup copy, the flow continues at block 206 and the data in the single backup copy is stored in the database. Otherwise, if more than one backup copy exists, the flow continues at block 208 and a determination is made whether all of the backup copies were made at a same time. If all of the backup copies were not made at the same time, then the flow continues at block 210. Otherwise, the flow continues at block 212 and characteristics about backup devices of the failed database are determined. In an embodiment, one characteristic about the backup devices can be the media type for each backup device. In an embodiment, another characteristic about the backup devices can be physical characteristics about each of the backup devices, such as latency, throughput, or the like.

At block 214, an amount of time required to restore data to the database from each backup device is determined. The list of backup devices is ordered based on the determined restore times at block 216. At block 218, a combination of backup devices that has a least amount of restore time is determined from the ordered list. In an embodiment, the combination may include multiple backup devices and particular percentages or portions of the data to retrieve from each backup device. For example, the combination can include that 70% of the data is to be received from a first backup device with a first length of restore time, that 20% of the data is to be received from a second backup device with the a second length of restore time, and that 10% of the data is to be received from a third backup device with a third length of restore time. In an embodiment, the first length of restore time is less than the second length of restore time, which in turn is less than the third length of restore time. The data is restored to the database base on the determined combination of backup devices at block 220.

Referring back to block 210, characteristics about backup devices of the failed database are determined. An amount of time required to restore data to the database from each backup device is determined at block 222. At block 224, the list of backup devices is ordered based on the determined restore times. A combination of backup devices that has a least amount of restore time is determined from the ordered list and based on time stamps of the backups at block 226. For example, if a first backup device has a later time stamp and the type of backup entry identifies the backup as a partial backup, then the combination can include that the data of the partial backup is to be received from the first backup device, that 50% of the data is to be received from a second backup device with a first length of restore time, that 20% of the data is to be received from a third backup device with the a second length of restore time, and that the remaining portion of the data is to be received from a fourth backup device with a third length of restore time. The data is restored to the database base on the determined combination of backup devices at block 228.

Figure 3:
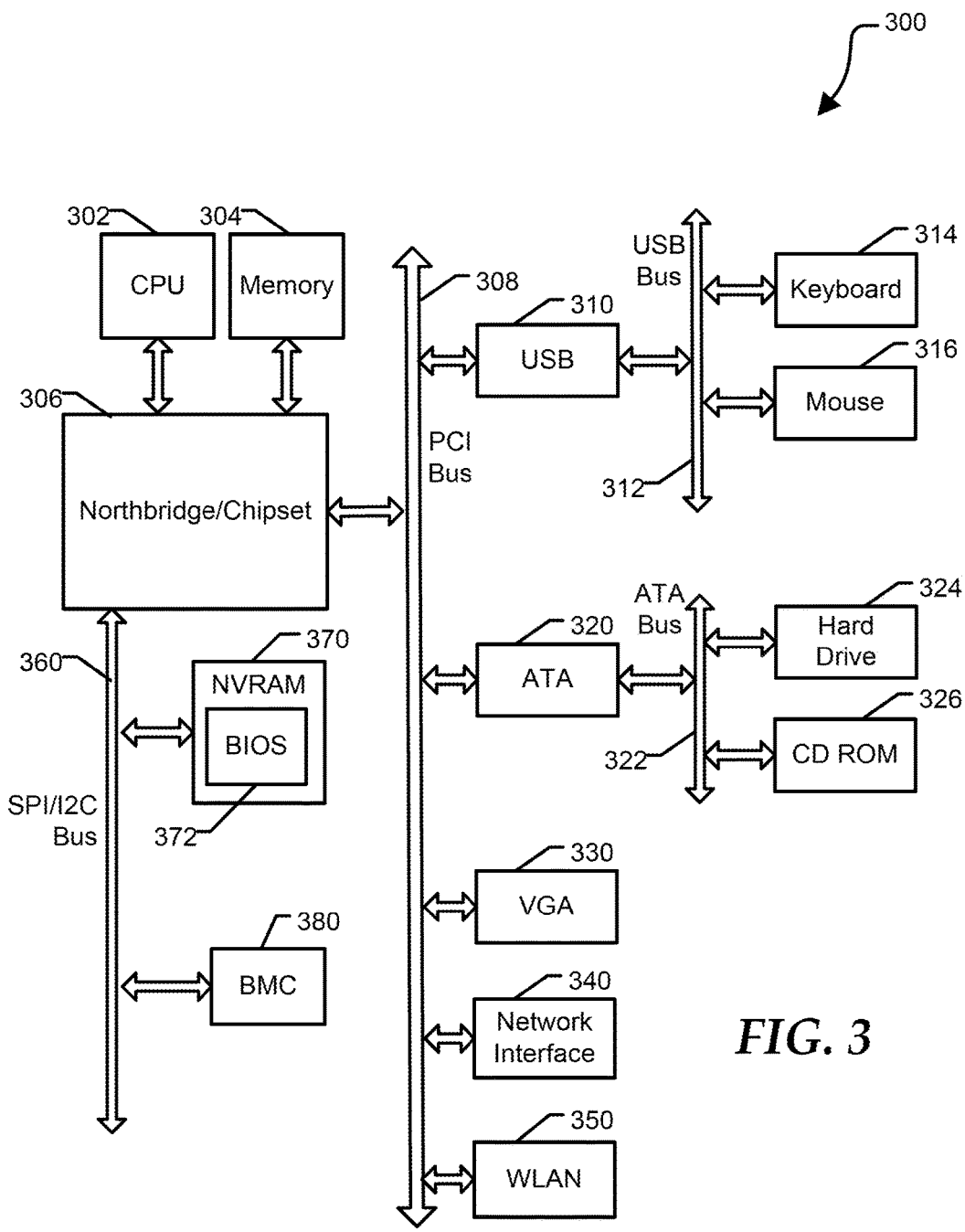
FIG. 3 is a block diagram of a general information handling system according to an embodiment of the present disclosure.

FIG. 3 illustrates a general information handling system 300 including a processor 302, a memory 304, a northbridge/chipset 306, a PCI bus 308, a universal serial bus (USB) controller 310, a USB 312, a keyboard device controller 314, a mouse device controller 316, a configuration an ATA bus controller 320, an ATA bus 322, a hard drive device controller 324, a compact disk read only memory (CD ROM) device controller 326, a video graphics array (VGA) device controller 330, a network interface controller (NIC) 340, a wireless local area network (WLAN) controller 350, a serial peripheral interface (SPI) bus 360, a NVRAM 370 for storing BIOS 372, and a baseboard management controller (BMC) 380. BMC 380 can be referred to as a service processor or embedded controller (EC). Capabilities and functions provided by BMC 380 can vary considerably based on the type of information handling system. For example, the term baseboard management system is often used to describe an embedded processor included at a server, while an embedded controller is more likely to be found in a consumer-level device. As disclosed herein, BMC 380 represents a processing device different from CPU 302, which provides various management functions for information handling system 300. For example, an embedded controller may be responsible for power management, cooling management, and the like. An embedded controller included at a data storage system can be referred to as a storage enclosure processor.

For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 300 can include processing resources for executing machine-executable code, such as CPU 302, a programmable logic array (PLA), an embedded device such as a System-on-a-Chip (SoC), or other control logic hardware. Information handling system 300 can also include one or more computer-readable medium for storing machine-executable code, such as software or data.

System 300 can include additional processors that are configured to provide localized or specific control functions, such as a battery management controller. Bus 360 can include one or more busses, including a SPI bus, an I2C bus, a system management bus (SMBUS), a power management bus (PMBUS), and the like. BMC 380 can be configured to provide out-of-band access to devices at information handling system 300. As used herein, out-of-band access herein refers to operations performed prior to execution of BIOS 372 by processor 302 to initialize operation of system 300.

BIOS 372 can be referred to as a firmware image, and the term BIOS is herein used interchangeably with the term firmware image, or simply firmware. BIOS 372 includes instructions executable by CPU 302 to initialize and test the hardware components of system 300, and to load a boot loader or an operating system (OS) from a mass storage device. BIOS 372 additionally provides an abstraction layer for the hardware, such as a consistent way for application programs and operating systems to interact with the keyboard, display, and other input/output devices. When power is first applied to information handling system 300, the system begins a sequence of initialization procedures. During the initialization sequence, also referred to as a boot sequence, components of system 300 are configured and enabled for operation, and device drivers can be installed. Device drivers provide an interface through which other components of the system 300 can communicate with a corresponding device.

Information handling system 300 can include additional components and additional busses, not shown for clarity. For example, system 300 can include multiple processor cores, audio devices, and the like. While a particular arrangement of bus technologies and interconnections is illustrated for the purpose of example, one of skill will appreciate that the techniques disclosed herein are applicable to other system architectures. System 300 can include multiple CPUs and redundant bus controllers. One or more components can be integrated together. For example, portions of northbridge/chipset 306 can be integrated within CPU 302. Additional components of information handling system 300 can include one or more storage devices that can store machine-executable code, one or more communications ports for communicating with external devices, and various input and output (I/O) devices, such as a keyboard, a mouse, and a video display. An example of information handling system 300 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 300 can include a set of instructions that can be executed to cause the information handling system to perform any one or more of the methods or computer based functions disclosed herein. The information handling system 300 may operate as a standalone device or may be connected to other computer systems or peripheral devices, such as by a network.

In a networked deployment, the information handling system 300 may operate in the capacity of a server or as a client user computer in a server-client user network environment, or as a peer computer system in a peer-to-peer (or distributed) network environment. The information handling system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single information handling system 300 is illustrated, the term "system" shall also be taken to include any collection of systems or sub-systems that individually or jointly execute a set, or multiple sets, of instructions to perform one or more computer functions.

The information handling system 300 can include a disk drive unit and may include a computer-readable medium, not shown in FIG. 3, in which one or more sets of instructions, such as software, can be embedded. Further, the instructions may embody one or more of the methods or logic as described herein. In a particular embodiment, the instructions may reside completely, or at least partially, within system memory 304 or another memory included at system 300, and/or within the processor 302 during execution by the information handling system 300. The system memory 304 and the processor 302 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving, at restore circuitry, a restore event notification that identifies a failure of a database of an information handling system;
   determining, by the restore circuitry, a number of backup copies for the database;
   deriving a restore time for each of a plurality of backup devices based on characteristics of the backup devices;
   deriving a total restore time for each of a plurality of combinations of backup devices based on the derived total restore time for each of the backup devices;
   selecting one combination of the backup devices from the combination of backup devices to restore data to the database during a restore operation based on the number of backup copies, wherein the combination of the backup devices includes first and second backup devices; and
   restoring the data to the database via a first thread associated with the first backup device, and via a second thread associated with the second backup device, wherein the first and second threads are executed in parallel.

2. The method of claim 1, further comprising:
   detecting the failure of the database; and
   providing the restore event notification in response to the failure of the database.

3. The method of claim 1, further comprising:
   determining characteristics of the backup devices associated with the number of backup copies; and
   wherein the deriving the restore time for each of the backup devices based on the characteristics of the backup devices was performed prior to selecting the combination of the backup devices.

4. The method of claim 3, further comprising:
   determining an ordered list of the backup devices based on the derived total restore time for each of the backup devices.

5. The method of claim 1, wherein the selected combination of the backup devices has a lowest total restore time of all of the combination of the backup devices.

6. The method of claim 3, wherein the characteristics include latency of each of the backup devices, and throughput of each of the backup devices.

7. The method of claim 1, further comprising:
   providing a restore complete notification in response to the data being restored to the database.

8. An information handling system comprising:
   a plurality of backup devices, the backup devices to store backup copies of data in the information handling system; and
   a host device including:
      a database to store the data for the information handling system; and
      restore circuitry to communicate with the database and with the backup devices, the restore circuitry to receive a restore event notification indicating a failure of the database, to determine a number of backup copies of the data in the backup devices, to determine percentages of data to be retrieved from each backup device, to select a combination of the backup devices to restore the data to the database based on the number of backup copies and the percentages of data to be retrieved from each backup device, wherein the combination of the backup devices includes first and second backup devices, and to restore the data to the database via a first thread associated with the first backup device and via a second thread associated with the second backup device, wherein the first and second threads are executed in parallel.

9. The information handling system of claim 8, wherein the host device further comprises:
redundancy circuitry to communication with the database, the redundancy circuitry to detect the failure of the database, and to provide the restore event notification in response to the failure of the database.

10. The information handling system of claim 8, the restore circuitry further to determine characteristics of each of the backup devices associated with the number of backup copies, and to derive a restore time for each of the backup devices based on the characteristics of the backup devices prior to selecting the combination of the backup devices.

11. The information handling system of claim 10, the restore circuitry further to derive a total restore time for each of a plurality of combinations of the backup devices based on the derived restore time for each of the backup devices.

12. The information handling system of claim 11, wherein the selected combination of the backup devices has a lowest total restore time of all of the combination of the backup devices.

13. The information handling system of claim 10, wherein the characteristics include latency of each of the backup devices, and throughput of each of the backup devices.

14. The information handling system of claim 8, the restore circuitry further to provide a restore complete notification in response to the data being restored to the database.

15. An information handling system comprising:
a plurality of backup devices, the backup devices to store backup copies of data in the information handling system; and
a host device including:
a database to store the data for the information handling system
backup circuitry to communicate with the database and with the backup devices, the backup circuitry to transfer the data from the database to the backup devices, and to store the data as the backup copies in the backup devices; and
restore circuitry to communicate with the database and with the backup devices, the restore circuitry to receive a restore event notification indicating a failure of the database, to determine a priority level of failed logical units of the database, to determine a number of backup copies of the data in the backup devices, to select a combination of the backup devices to restore the data to the database based on the number of backup copies, to determine characteristics of each of the backup devices associated with the number of backup copies, to derive a restore time for each of the backup devices based on the characteristics of the backup devices prior to selecting the combination of the backup devices, to derive a total restore time for each of a plurality of combinations of the backup devices based on the derived restore time of each of the backup devices, wherein the restore begins with a highest priority level logical unit of the failed logical units, wherein the combination of the backup devices includes first and second backup devices, and to restore the data to the database via a first thread associated with the first backup device, and a second thread associated with the second backup device, wherein the first and second threads are executed in parallel.

16. The information handling system of claim 15, wherein the selected combination of the backup devices has a lowest total restore time of all of the combination of the backup devices.

17. The information handling system of claim 15, wherein the characteristics include latency of each of the backup devices, and throughput of each of the backup devices.

18. The information handling system of claim 15, the restore circuitry further to provide a restore complete notification in response to the data being restored to the database.

* * * * *